2 Sheets--Sheet 1.

A. G. MOORE.
Corn-Row Marker.

No. 163,510. Patented May 18, 1875.

WITNESSES
E. H. Bates
Geo. E. Upham

INVENTOR
Albert G. Moore,
Chipman Hosmer & Co
ATTORNEYS

THE GRAPHIC CO. PHOTO-LITH. 39 & 41 PARK PLACE, N.Y.

2 Sheets--Sheet 2.
A. G. MOORE.
Corn-Row Marker.
No. 163,510. Patented May 18, 1875.
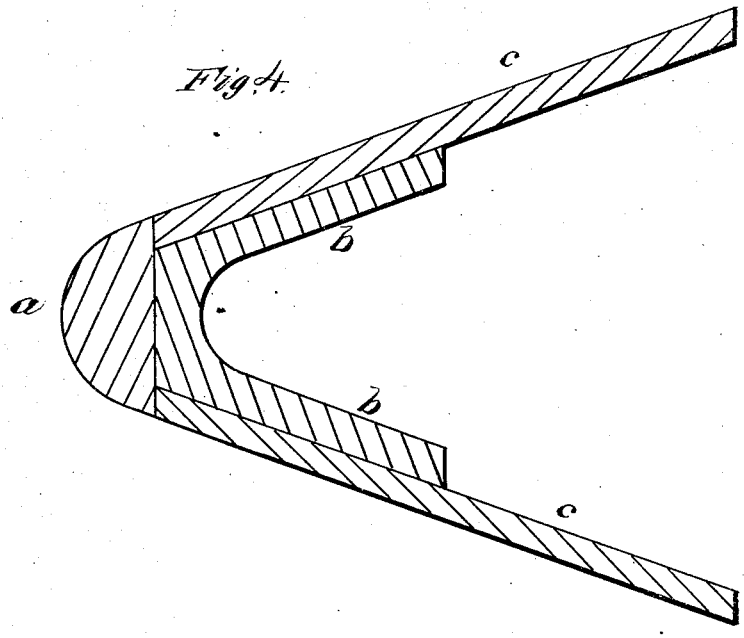
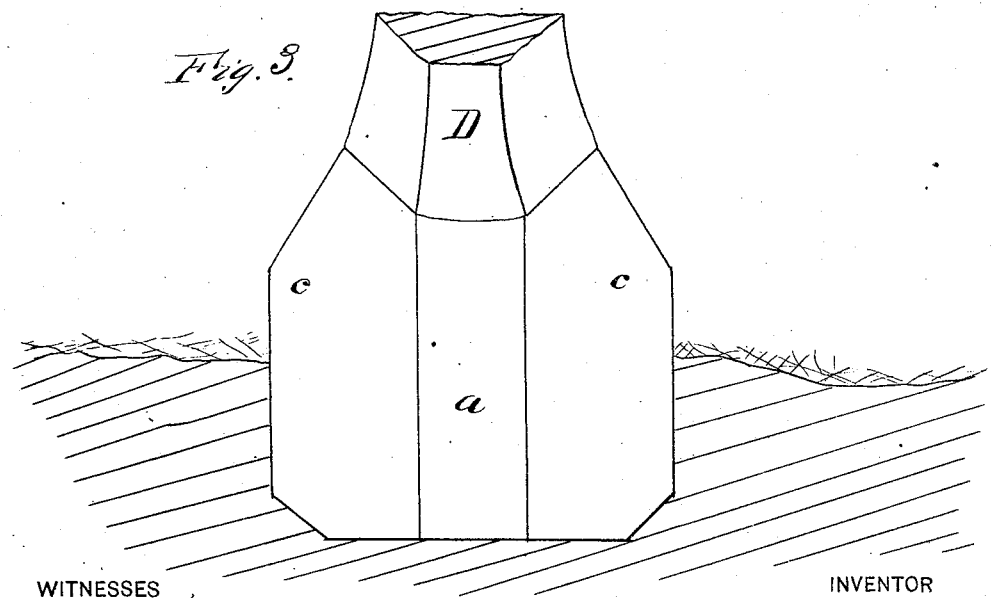
WITNESSES
INVENTOR
Albert G. Moore
ATTORNEYS

UNITED STATES PATENT OFFICE.

ALBERT G. MOORE, OF UNIONTOWN, PENNSYLVANIA.

IMPROVEMENT IN CORN-ROW MARKERS.

Specification forming part of Letters Patent No. 163,510, dated May 18, 1875; application filed March 6, 1875.

*To all whom it may concern:*

Be it known that I, ALBERT G. MOORE, of Uniontown, in the county of Fayette and State of Pennsylvania, have invented a new and valuable Improvement in Corn-Row Markers; and I do hereby declare that the following is a full, clear, and exact description of the construction and operation of the same, reference being had to the annexed drawings, making a part of this specification, and to the letters and figures of reference marked thereon.

Figure 1:
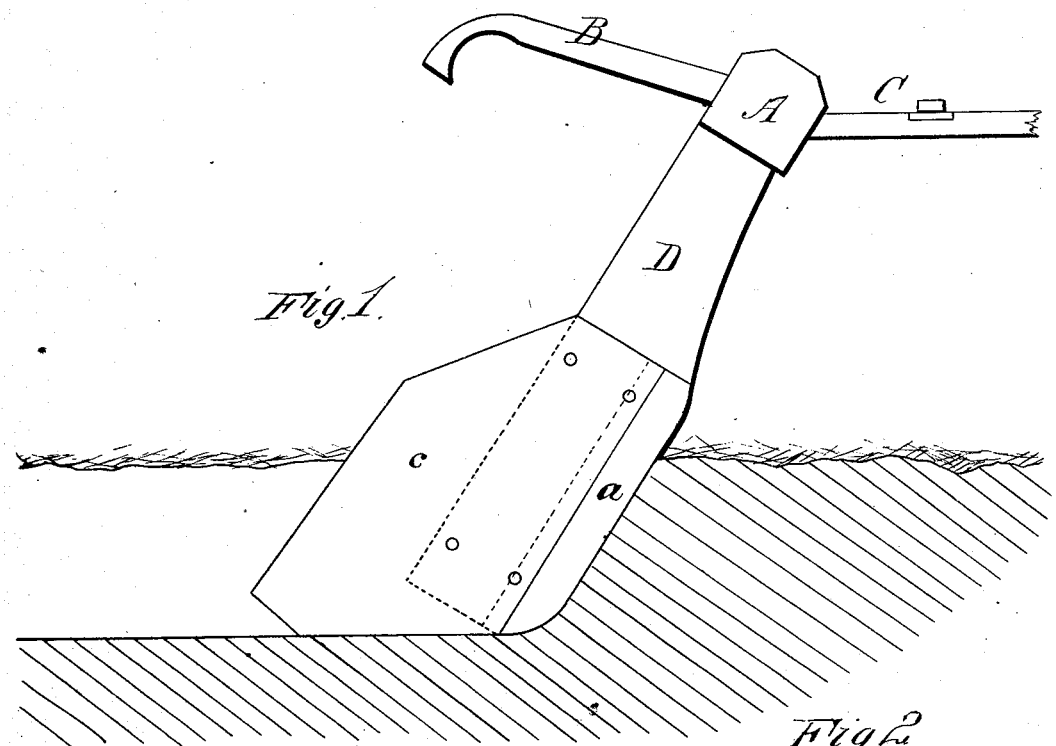
Figure 2:
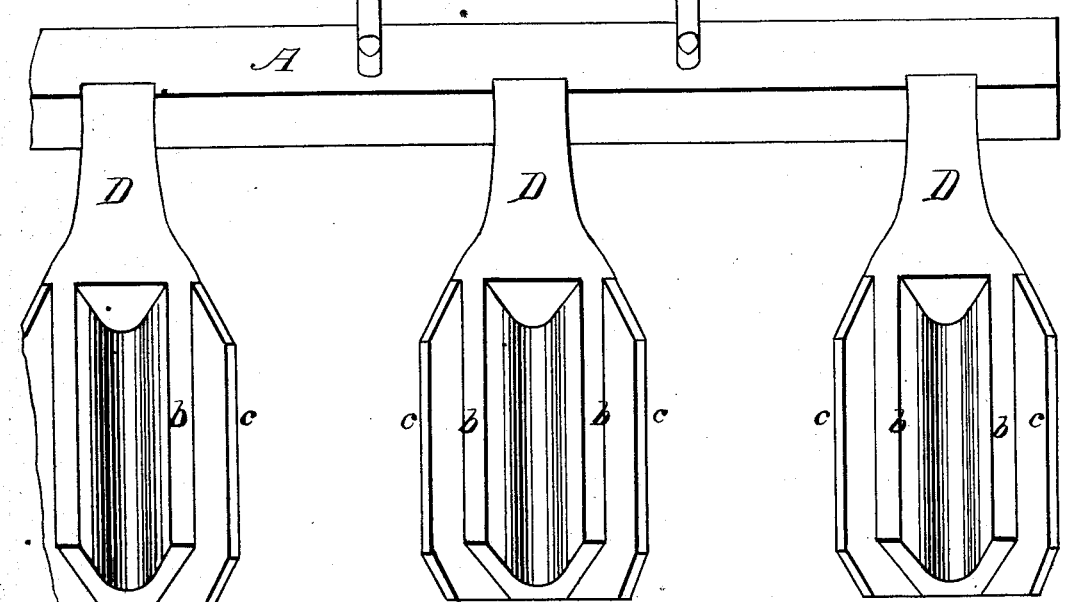

Figure 1 of the drawing is a representation of a side view of my corn-row marker, and Fig. 2 is a plan view of the same. Fig. 3 is a sectional view, and Fig. 4 is a detail view.

This invention has relation to implements which are designed for marking off fields in shallow drills for the purpose of receiving corn, and the nature of my invention consists in teeth, which are secured to a suitable frame, and inclined forward, and which have rounded front edges and flaring wings, whereby drills are formed which have packed sides and flat bottoms, as will be understood from the following description.

In the annexed drawings, A designates a beam, having handles B and thills C, suitably secured to it. To this beam A I secure my improved teeth so that they incline forward.

Each tooth consists of a shank, D, the lower portion of the front edge, $a$, of which is rounded transversely, as shown in Fig. 4, and the sides $b$ $b$ flare backward. To the sides of each tooth wings $c$ $c$ are secured, the outer surfaces of which are flush with the rounded front edge $a$, so that the front edges of these wings will not offer any obstruction while marking off the land. These wings $c$ $c$ may be made of thin steel, and they are secured to the standard of the tooth, so that they are removable. The bottom of each tooth is straight, and leaves the bottom of the drill flat, and as broad as the distance between the rear ends of the wings.

Any desired number of teeth may be used, and provison may be made for adjusting the teeth different distances apart, according to the width of rows required.

What I claim as new, and desire to secure by Letters Patent, is—

In a land-marker, the inclined teeth D, constructed with rounded front edges $a$, flaring wings $c$ $c$, and flat bottom, substantially as shown and specified.

In testimony that I claim the above I have hereunto subscribed my name in the presence of two witnesses.

ALBERT G. MOORE.

Witnesses:
 JOS. B. LOOMIS.
 GEORGE E. UPHAM.